(12) United States Patent
Marukawa et al.

(10) Patent No.: US 6,761,992 B1
(45) Date of Patent: Jul. 13, 2004

(54) RESTRAINING BANDS FOR BATTERY PACK

(75) Inventors: Shuhei Marukawa, Toyohashi (JP); Ko Watanabe, Toyohashi (JP); Toyohiko Eto, Toyota (JP); Shogo Yoneda, Toyota (JP); Nobuaki Kiya, Toyota (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 82 days.

(21) Appl. No.: 09/652,183

(22) Filed: Aug. 31, 2000

(30) Foreign Application Priority Data

Aug. 31, 1999 (JP) .......................................... 11-244223

(51) Int. Cl.⁷ ................................................ H01M 2/04
(52) U.S. Cl. ........................ 429/96; 429/159; 429/160
(58) Field of Search .......................... 429/96, 148, 152, 429/159, 160

(56) References Cited

U.S. PATENT DOCUMENTS 5,456,994 A    10/1995  Mita
5,756,227 A  *  5/1998  Suzuki ......................... 429/62
5,800,942 A  *  9/1998  Hamada ...................... 429/148
5,906,899 A  *  5/1999  Noda .......................... 429/149
6,312,851 B1 * 11/2001  Fukuda ....................... 429/176

FOREIGN PATENT DOCUMENTS

| JP | 08-321329  | 12/1996 |
| JP | 09-120809  | 5/1997  |
| JP | 10-106637  | 4/1998  |

* cited by examiner

*Primary Examiner*—Patrick Ryan
*Assistant Examiner*—Mark Ruthkosky

(57) ABSTRACT

The battery pack is constituted by arranging a plurality of prismatic battery modules adjacently in a condition with coolant passages formed between battery modules and with their side faces of large area being arranged in superimposed manner, and are integrated by tying end plates, arranged at both ends in the direction of arrangement of battery modules tightly together by restraining straps. A plurality of restraining straps are arranged at suitable intervals on the long side face of a battery pack and the restraining straps are constituted of at least one strip of rectangular cross-sectional shape or by round rods or pipe members of circular cross-sectional shape whose dimension in the direction perpendicular to the long side face of battery pack is larger than the dimension in the parallel direction.

29 Claims, 7 Drawing Sheets

RESTRAINING BANDS FOR BATTERY PACK

BACKGROUND OF THE INVENTION

The present invention relates to a battery pack constituted by arranging aligned adjacent each other a plurality of prismatic battery modules.

In a known prior art battery pack 21 constituted by arranging aligned adjacent each other a plurality of prismatic battery modules, as shown in FIG. 7, end plates 23 are arranged at both ends in the direction of adjacent arrangement of adjacently arranged battery modules 22, the pack being integrated by restraining the battery modules 22 by linking the two end plates 23, 23 by restraining straps 24. Also, in this battery pack 21, in order to effectively cool the adjacently arranged battery modules 22, a large number of dispersed projections which abut each other when these battery modules 22 are adjacently arranged project on the two lateral faces of battery modules 22, coolant passages being formed between the opposite side faces of battery modules 22 by means of these projections.

The restraining straps 24 are typically constructed of strip-shaped plates, a pair of these being arranged with suitable separation on the respective mutually opposite long side faces of battery pack 21, the plate faces being arranged along the long side faces and the two ends being fixed by rivets 25 to end plates 23.

Consideration has also been given to an arrangement as shown in FIG. 8 wherein one or a plurality of restraining straps 26 are arranged along the pair of mutually opposite short side faces of battery pack 21, both ends thereof being fixed by rivets to end plates 23, both lateral faces of each battery module 22 being arranged to be effectively cooled by passing coolant in the direction indicated by the white arrow i.e. in the direction passing through the long side faces of battery pack 21.

However, in the construction of the battery pack 21 shown in FIG. 7, when the battery modules 22 are cooled by passing coolant in the direction passing through the long side faces of battery pack 21, the restraining straps 24 present obstructions to the flow of coolant, so that the coolant is unable to flow satisfactorily in a region of a wide area where the restraining straps 24 are arranged, making it impossible to cool battery modules 22 evenly and producing a poor cooling effect; as a result, there is the problem that the output characteristic and life of battery modules 22 are adversely affected.

In the construction of the battery pack 21 shown in FIG. 8, although efficient cooling of the battery modules 22 can be achieved since coolant flows through the entire surface of the long side faces, when large loads caused by expansion or rise in internal pressure due to charging/discharging of battery modules 22 act, there is the problem that deformation occurs in the middle of end plates 23 due to the long span between restraining straps 26, 26.

Also, since both ends of the restraining straps 24, 26 are fixed to end plates 23 by means of rivets 25, when disassembling battery pack 21 for purposes of maintenance, it is necessary to cut rivets 25, risking damaging end plates 23 and/or restraining straps 24, 26. A further risk is that, since the compressive force acting on battery pack 21 is released all at once simultaneously with the cutting of rivets 25, fragments of rivets 25 may fly about and end plates 23 and/or restraining straps 24, 26 may spring up. Yet a further problem is that also when assembling battery pack 21 a separate restraining jig is required; this makes the operation difficult to perform by anyone other than the manufacturer of battery pack 21; also, insufficiency of the strength of the rivet joints is liable to occur and there is a risk of their breaking.

SUMMARY OF THE INVENTION

In view of the above, an object of the present invention is to provide a battery pack wherein the battery modules can be efficiently cooled, there is no risk of deformation of the end plates, assembly can be achieved with restraining straps of fully sufficient strength and assembly or removal can be performed without a special jig, so that assembly and maintenance can be performed easily and efficiently.

In a battery pack according to the present invention in which prismatic battery modules are arranged adjacently in a condition with coolant passages formed between the battery modules and with their side faces of largest area being arranged in superimposed manner, being integrated by tying end plates arranged at both ends in the direction of adjacent arrangement of the battery modules tightly together by restraining straps, a plurality of restraining straps are arranged at suitable intervals on the long side face of the battery pack and the restraining straps have a cross-sectional shape in which their dimension in the perpendicular direction with respect to the long side face of the battery pack is larger than their dimension in the parallel direction.

In this way, there is no risk of deformation of the end plates since the span between the restraining straps is short, since the plurality of restraining straps are arranged with suitable intervals on the long side face of the battery pack. Furthermore, since the battery modules are arranged to be cooled by passing coolant in the direction passing through the long side face and, even if a plurality of restraining bands are provided on the long side face, the cross-sectional dimension of the restraining bands is small in the direction impeding the flow of coolant, the battery modules can be effectively cooled, making it possible to improve the output characteristic and life of the battery modules.

Suitable the cross-sectional shape of the restraining straps is a shape in which a curved surface along the direction of flow of the coolant that passes through the coolant passages or a plane parallel to the direction of flow occupies most of the external surface. Specifically, the restraining straps consist of members of circular cross-section, plate faces at both ends thereof being provided with a mounting portion along the mounting face of the end plate. Or the restraining straps consist of strip of rectangular cross-sectional shape arranged with its long side perpendicular to the long side face of the battery pack, plate faces at both ends thereof being provided with a mounting portion along the mounting face of the end plate.

If coolant passages are formed in the end plates in the direction perpendicular to the long side face of the battery pack, the side faces of the battery modules adjacent the end plate can also be efficiently cooled, so the output characteristic and life of all of the battery modules constituting the battery pack can be improved.

In a battery pack according to the present invention in which prismatic battery modules are arranged adjacently with their side faces of largest area being adjacently arranged in superimposed manner, being integrated by tying end plates arranged at both ends in the direction of arrangement of the battery modules tightly together by restraining straps, at least one end of the restraining straps and a mounting portion of one end plate are provided with a screw mechanism arranged along the longitudinal direction of the restraining strap whereby the effective length of the restraining strap can be extended or diminished. By giving the screw mechanism a sufficient degree of strength, assembly of the restraining straps can be achieved with a fully sufficient degree of strength. Also, since assembly/removal of the restraining straps can be performed by operation of the screw mechanism without using a special jig, assembly and/or maintenance can be performed easily and efficiently.

Suitably, by providing a tightening bolt whereof the head is engaged with one end of the restraining strap or one end is fixed, by forming a bolt hole through which the tightening bolt passes in the end plate, and by engaging a nut threaded onto the tightening bolt with the side of the end plate opposite to the side that adjoins the battery modules, the foregoing actions and effects can be achieved with a simple construction.

Also, by making the end plates of material that is molded by drawing, end plates of any desired cross-sectional shape can be obtained, so end plates having the necessary strength can be obtained with a compact size, and end plates having coolant passages as described above can be formed in a simple manner.

While novel features of the invention are set forth in the preceding, the invention, both as to organization and content, can be further understood and appreciated, along with other objects and features thereof, from the following detailed description and examples when taken in conjunction with the attached drawings.

DESCRIPTION OF PREFERRED EMBODIMENTS

One embodiment of a battery pack according to the present invention is described below with reference to FIG. 1 to FIG. 4.

Figure 1:
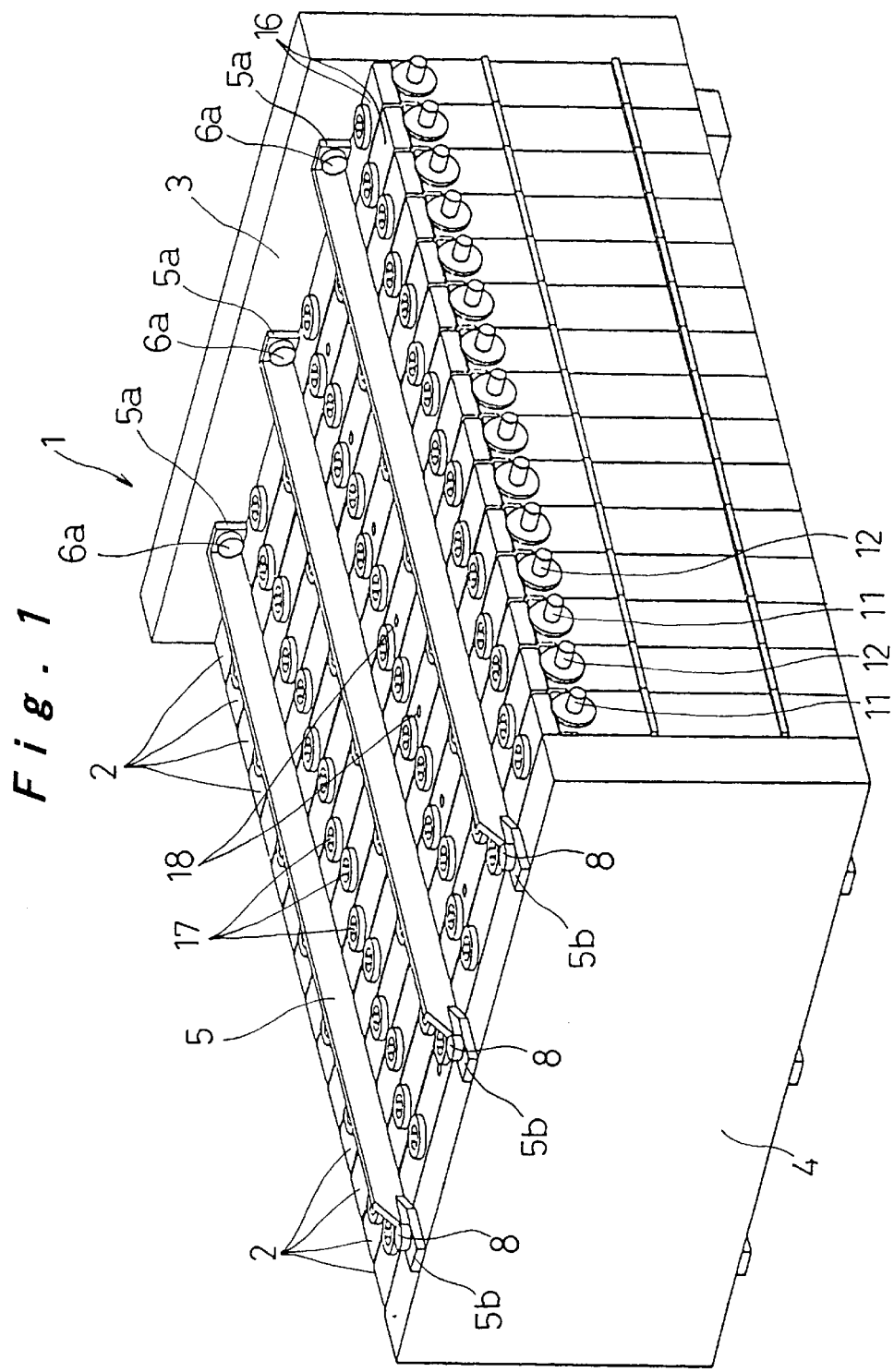
FIG. 1 is a cross-sectional view of a battery pack according to an embodiment of the present invention.
Figure 2:
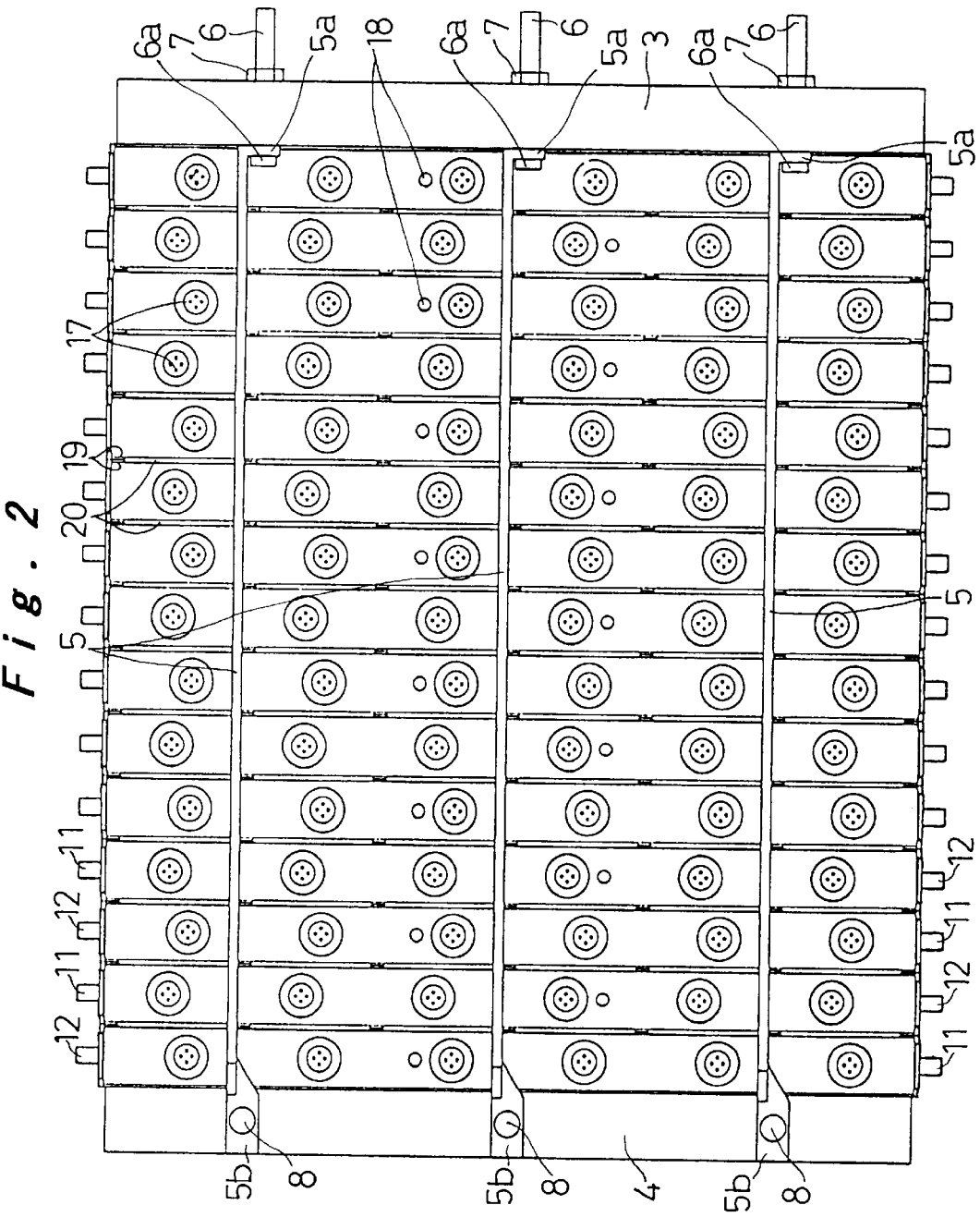
FIG. 2 a plan view of a battery pack of this embodiment.
Figure 3:
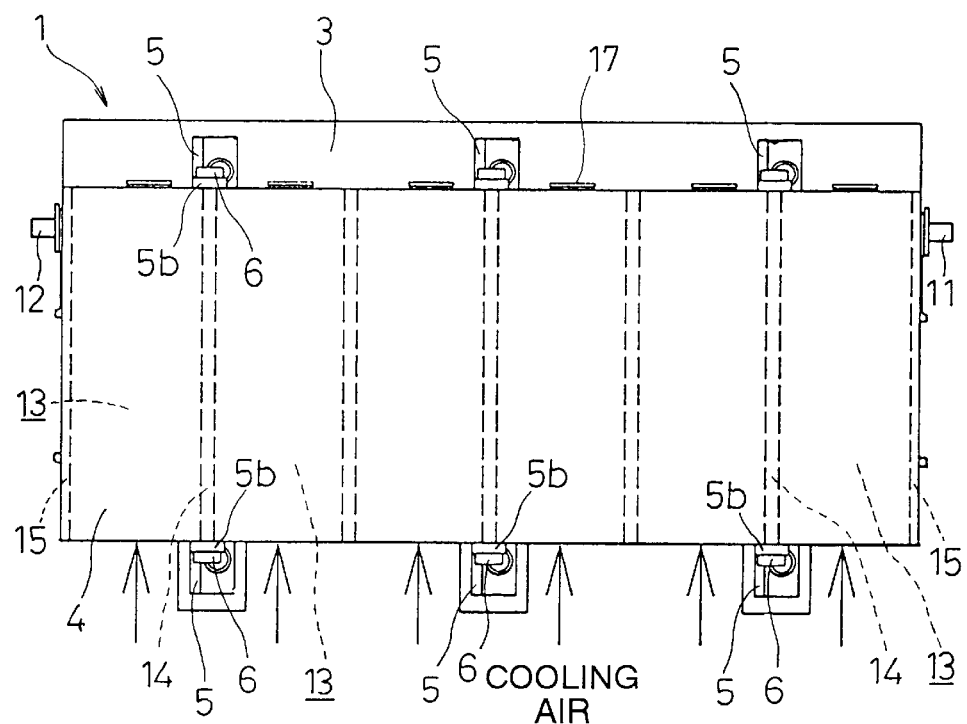
FIG. 3 is a front view of a battery pack according to this embodiment.

In FIG. 1 to FIG. 3, battery pack 1 according to this embodiment is constituted such that it can conveniently be employed as the drive power source for an electric vehicle and is constituted by arranging adjacent each other a plurality (in the example illustrated, 15) of prismatic battery modules 2 of flat plate shape comprising nickel metal hydride batteries. An integral battery pack 1 is constituted by disposing end plates 3, 4 at both ends in the direction of adjacent arrangement of the adjacently arranged battery modules 2, their upper ends and lower ends being tied together by a plurality (in the example illustrated, three) of restraining straps 5 respectively arranged with a suitable separation.

Positive electrode and negative electrode connecting terminals 11, 12 project at the upper ends of both end faces in the direction of elongation of battery modules 2, the positive electrode and negative electrode connecting terminals 11, 12 of battery modules 2 are adjacently arranged so as to alternate in opposite directions; thus, battery modules 2 are connected in series by sequential mutual connection of adjacent connecting terminals 11, 12.

As shown by the broken lines in FIG. 3, battery modules 2 are constituted by an integral battery case formed by mutually unitarily linking a plurality (in this embodiment, six) of rectangular prismatic cell cases 13 having short lateral walls and long lateral walls, the short lateral walls being shared as partitions 14 between the cell cases 13, 13, and the outside short lateral walls of the cell cases 13 at both ends constituting the end walls 15 of the integral battery case. Cells are constituted by accommodating electrolyte and electrode groups consisting of a large number of positive electrode plates and negative electrode plates within cell cases 13 parallel with the long lateral walls and stacked in the direction of the short lateral walls with intervening separators. A battery module 2 is constituted by connecting these six cells in series within an integral battery case, connecting terminals 11, 12 being connected to the cells at both ends.

The upper end of the integral battery case is closed by a lid 16 that is integrally joined thereto. In this lid 16 there is arranged a safety vent 17 for releasing pressure when the internal pressure of the cells reaches a fixed value. Also, temperature detection holes 18 fitted with temperature detection sensors for detecting the temperature of each cell are formed therein.

Rib-shaped projections 19 extending vertically in positions opposite partitions 14 and end walls 15 of the two side ends of cell cases 13 are provided on the long lateral walls of battery modules 2 and, if required, a large number of comparatively small circular projections or the like are provided in a matrix arrangement with a suitable pitch between rib-shaped projections 19, 19, so that, when battery modules 2 are arranged adjacent each other, coolant passages 20 are formed between these projections.

Restraining straps 5 are constituted by strip of rectangular cross-sectional shape and whose long side is arranged perpendicularly to the long side face of battery pack 1, being so arranged that the flat face parallel to the direction of flow of the coolant that passes through the coolant passages 20 occupies most of the external surface of restraining straps 5. At one end of restraining strap 5, there is formed an L-shaped mounting portion 5a that is bent in the shape of an L with respect to the direction of elongation of restraining strap 5 and abuts the face of end plate 3 that is opposite battery modules 2. At the other end of restraining strap 5, there is formed a mounting strip 5b projecting in L-shaped fashion in the cross-sectional direction of restraining strap 5 and abutting the peripheral side face of end plate 4.

The head 6a of a tightening bolt 6 that is inserted extending in the longitudinal direction of the restraining strap 5 engages with and is fixed to L-shaped mounting portion 5a, with tightening bolt 6 passing through a bolt hole formed in end plate 3. A nut 7 that is threaded on from the leading end of this tightening bolt 6 is engaged therewith on the opposite side to the face of end plate 3 that abuts the battery modules 2. Mounting strip 5b is fixed to end plate 4 by tightening mounting bolt 8.

With a battery pack 1 constructed as above, since a plurality of restraining straps 5 are arranged at suitable intervals on the long lateral wall of battery pack 1, the arrangement span between restraining straps 5, 5 can be made short, and the risk of deformation of end plates 3, 4 due to expansion or rise in internal pressure accompanying charging/discharging of the battery modules 2 can be eliminated. Furthermore, since the battery modules 2 are cooled efficiently and uniformly in their entirety due to the restraining straps 5 being constructed of strips of rectangular cross-sectional shape with their long sides arranged perpendicularly to the long lateral wall of battery pack 1, as shown in FIG. 3, even if a current of cooling air is passed in the direction passing through the long lateral wall of battery pack 1, since the cross-sectional dimension of these restraining straps 5 is small in the direction impeding the flow of the cooling air current, there is no possibility of the flow of cooling air being impeded and the battery modules 2 can be efficiently cooled. In this way, the battery modules 2 of battery pack 1 can be efficiently cooled, making it possible to improve the output characteristic and life.

Figure 4:
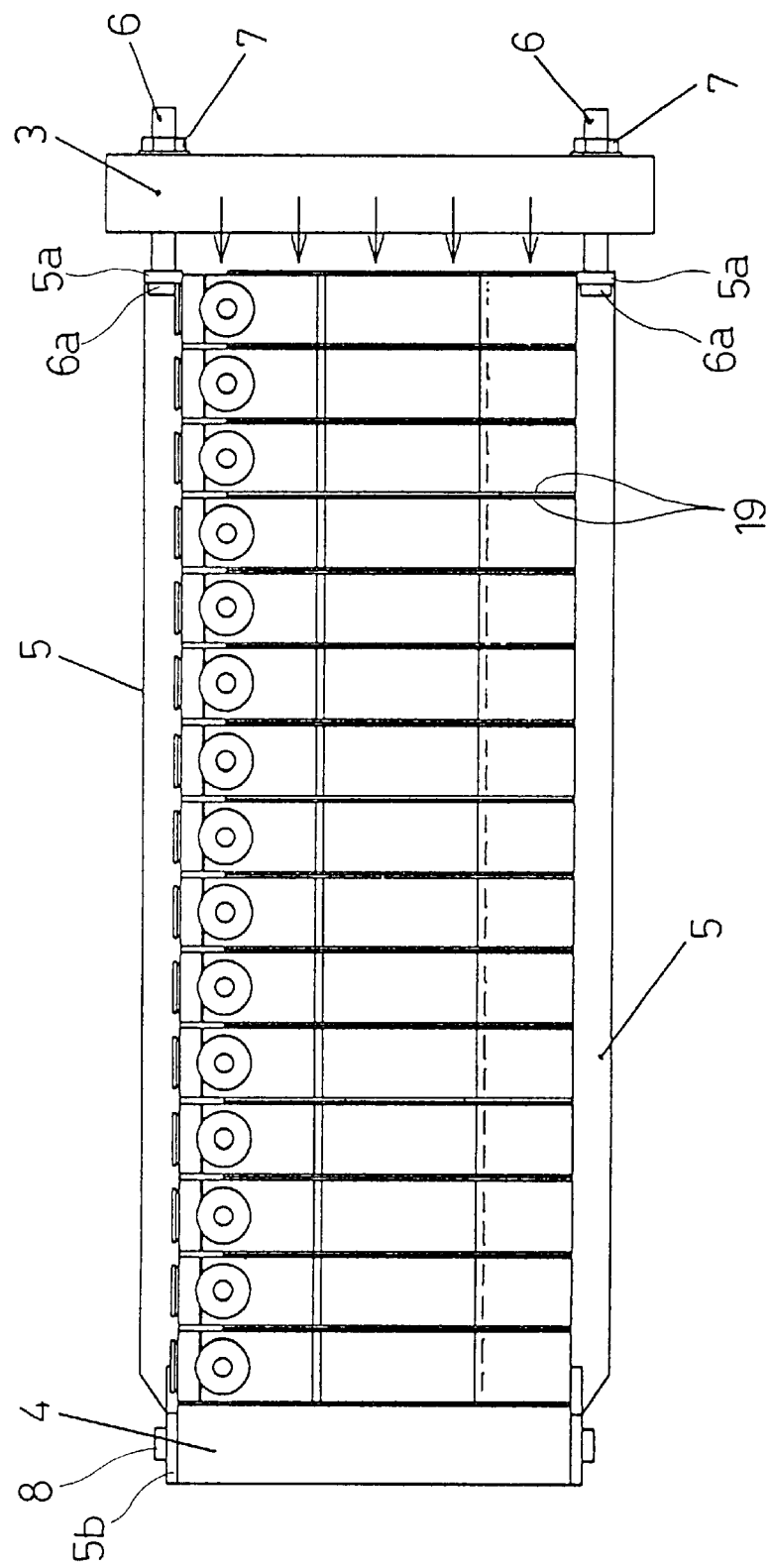
FIG. 4 is a side view of a step of restraining a battery pack according to this embodiment.

When assembling battery pack 1, first of all, battery modules 2 are arranged adjacent each other and end plates 3, 4 are arranged at both ends thereof, and tightening bolts 6 extending from the L-shaped mounting portions 5a at one end of restraining straps 5 are inserted into the bolt-holes of the end plate 3 and nuts 7 are threaded on from the tips of these tightening bolts 6, and the mounting strips 5b at the other ends of restraining straps 5 are fixed to end plate 4 by tightening mounting bolts 8. After this, as shown in FIG. 4, assembly of restraining straps 5 can be effected by an easy operation without using a special jig, since the prescribed restraining condition can be produced by pressing end plate 3 onto the group of battery modules 2 in the direction shown by the arrow by further screwing on nuts 7. Assembly of restraining straps 5 can be achieved with a fully sufficient degree of strength by giving tightening bolts 6 the necessary degree of strength in order for the pressure produced by expansion and/or rise in internal pressure resulting from charging/discharging of battery modules 2 to be borne as axial load of tightening bolts 6.

When battery pack 1 is disassembled for purposes of maintenance etc, the restraining force on battery modules 2 can be gradually released by slackening nuts 7. Thus, there is no risk of damaging end plates 3, 4 and/or restraining straps 5 as there is in the prior art example when the rivets are cut. Thus, disassembly and assembly can be effected in a safe and operationally effective manner.

Figure 5:
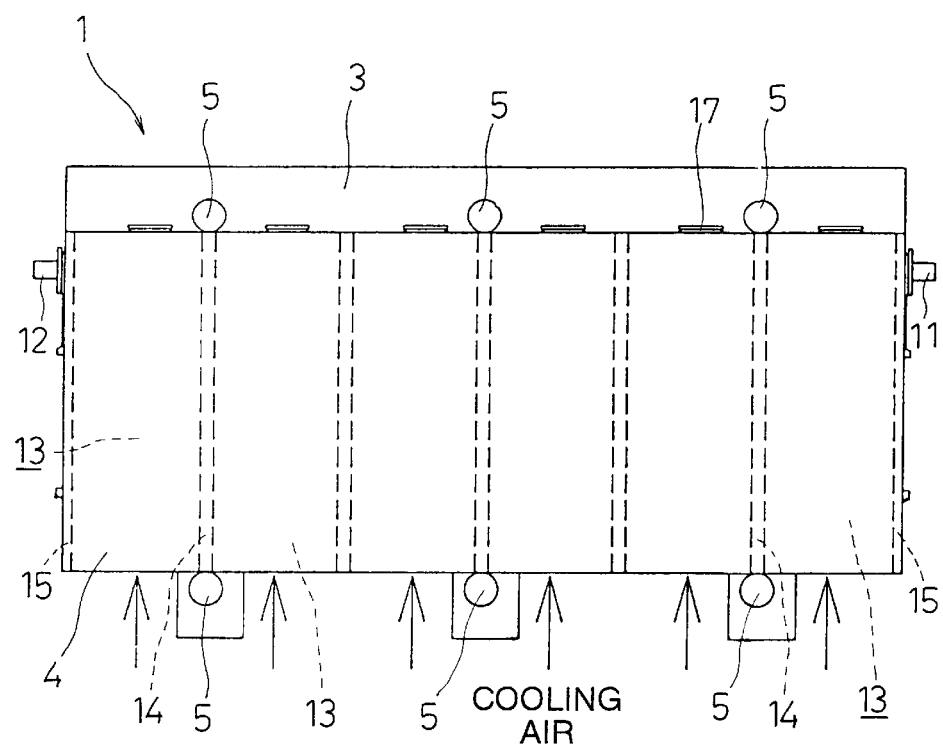
FIG. 5 is a front view of a battery pack according to a further embodiment of the present invention.

Although, in the above embodiment, strips of rectangular cross-sectional shape are employed for restraining straps 5, these could be constituted by members of circular cross-section, such as round rods or pipes, as shown in FIG. 5. In this case also, mounting portions identical with those of the embodiment described above could be formed at both ends of restraining straps 5 in order to mount these on end plates 3, 4. In this embodiment also, the cross-sectional dimension of restraining straps 5b is small in the direction impeding the flow of coolant, so the battery modules can be cooled in an effective manner, making it possible to improve the output characteristic and life.

Figure 6:
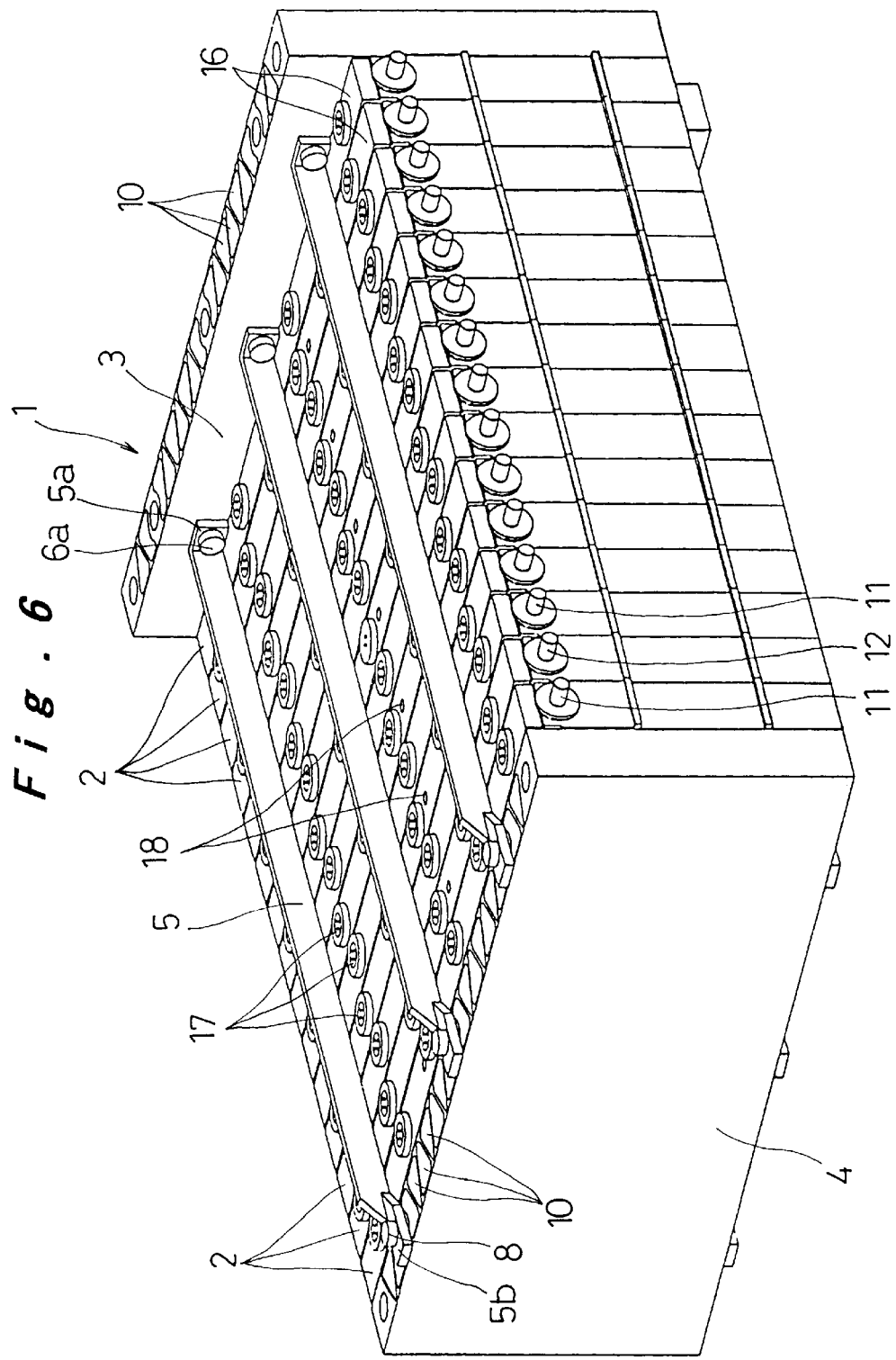
FIG. 6 is a perspective view of a battery pack according to yet a further embodiment of the present invention.
Figure 7:
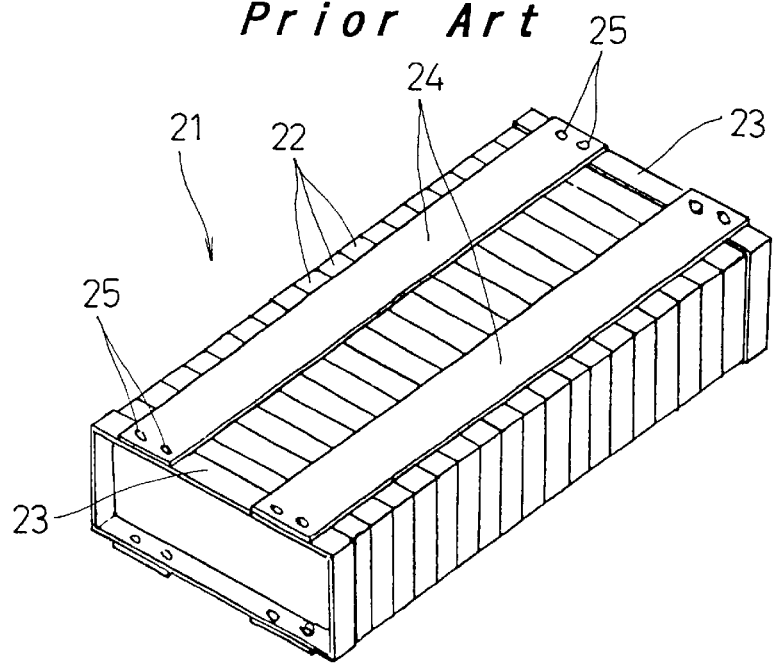
FIG. 7 is a perspective view of a battery pack constituting a prior art example.
Figure 8:
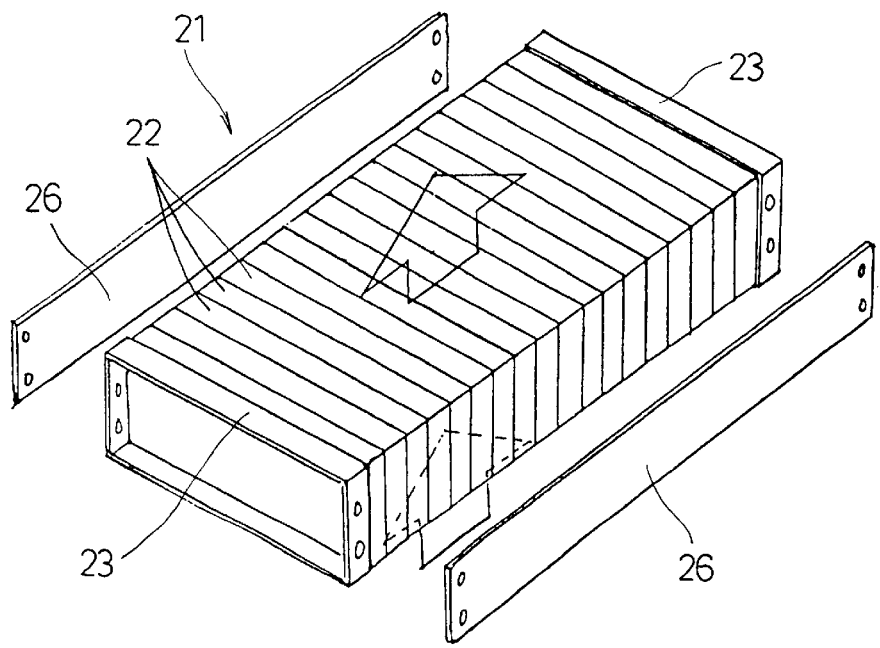
FIG. 8 is a perspective view showing the disassembled condition of another prior art example.

Also, although, in the embodiments described above, the cross-sectional construction of end plates 3, 4 is not specified and end plates made for example of metal sheet of any desired shape and construction and of any desired material properties can be employed, if they are constructed of material molded by drawing such as aluminum alloy, end plates of any desired cross-sectional shape can be obtained and end plates having the necessary strength which are of compact shape can be obtained. In particular, as shown in FIG. 6, if coolant passages 10 are formed within end plates 3, 4 in the direction perpendicular to the long lateral wall of battery pack 1, there is no need to provide any further passages for downwards circulation of coolant that is delivered from above battery pack 1, so a battery pack are of high volume efficiency can be obtained and the side faces of battery modules 2 that are in contact with the end plates 3, 4 can be efficiently cooled, thereby making it possible to improve the output characteristic and life of all of the battery modules 2 constituting battery pack 1.

Furthermore, although, in the embodiments described above, examples were illustrated in which the respective restraining straps 5 were arranged on the long side faces on both the upper side and underside of battery pack 1, a construction would be possible in which restraint of the long side face on one side is effected by means for applying pressure etc provided on another structural item in a condition supported by this structural item.

With a battery pack according to the present invention, as will be clear from the above description, thanks to the provision of a plurality of restraining straps on the long side face of the battery pack as a suitable intervals, the risk of deformation of the end plates is eliminated, since the span between the restraining straps is short. Furthermore, the battery modules are arranged to be cooled by passing coolant in the direction passing through the long side face of the battery pack and even though a plurality of restraining straps are arranged on this long side face, the dimension of the cross-sectional shape of the restraining straps in the direction perpendicular with respect to the long side face of the battery pack is larger than the dimension in the parallel direction, so this cross-sectional dimension is small in the direction obstructing the flow of coolant the battery modules can therefore be cooled efficiently and the output characteristic and life of the battery modules can be improved.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery pack comprising:

a plurality of prismatic battery modules, each prismatic battery module of said plurality of prismatic battery modules having six side faces with opposing side faces having substantially equal side face surface area, two of the side faces having surface areas equal to or greater than the remaining four side faces surface areas;

said plurality of prismatic battery modules arranged so that said two side faces of each prismatic battery module of said plurality of prismatic battery modules are adjacent a respective one side face of said two side faces of adjacent prismatic battery modules of said plurality of prismatic battery modules except at a first end and a second end in a direction of arrangement of said plurality of prismatic battery modules with coolant passages between the plurality of prismatic battery modules;

end plates arranged at the first end and the second end of the plurality of prismatic battery modules; and restraining straps tying the plurality of prismatic battery modules together arranged at predetermined intervals on a side face of the remaining four side faces of the plurality of prismatic battery modules, said restraining straps each having a height, a width and a length, wherein the length is perpendicular to the surface areas of said two of the side faces having surface areas equal to or greater than the remaining four side faces surfaces areas and said height is greater than said width.

2. The battery pack of claim 1, wherein the length of the restraining strap is greater than the height of the restraining strap.

3. The battery pack of claim 2, further comprising a mounting portion having a surface wherein the mounting portion is provided at a first end and a second end of the restraining straps, and said mounting portion includes surfaces parallel to a plurality of respective mounting faces of the end plates.

4. The battery pack of claim 3, wherein the restraining straps have members of circular cross-section.

5. The battery pack of claim 1, wherein the coolant passages are formed between the end plates and the first end and the second end of the plurality of prismatic battery modules, respectively.

6. The battery pack of claim 1, wherein the end plates are made of material that is molded by drawing.

7. A battery pack comprising:
a plurality of prismatic battery modules, each prismatic battery module of said plurality of prismatic battery modules having six side faces with opposing side faces having substantially equal side face surface area, two of the side faces having surface areas equal to or greater than the remaining four side faces surface areas;
said plurality of prismatic battery modules arranged so that said two side faces of each prismatic battery module of said plurality of prismatic battery modules are adjacent a respective one side face of said two side faces of adjacent prismatic battery modules of said plurality of prismatic battery modules except at a first end and a second end in a direction of arrangement of said plurality of prismatic battery modules;
end plates arranged at the first end and the second end of the plurality of prismatic battery modules, each having a mounting portion;
restraining straps for tying the plurality of battery modules together;
a screw mechanism arranged along a longitudinal direction of the restraining straps such that an effective length of the restraining straps can be extended or diminished, and said screw mechanism being provided at at least one end of the restraining straps and at a mounting portion of one end plate; and
said screw mechanism bearing as an axial load pressure produced by expansion and/or rise in internal pressure resulting from the charging/discharging of said plurality of prismatic battery modules.

8. The battery pack of claim 7, further comprising:
at least one end plate of the end plates having an aperture; and
the screw mechanism having:
a tightening bolt; and
a nut,
wherein a head of the tightening bolt is fixedly engaged with one end of a restraining strap of the restraining straps, the tightening bolt passes through the aperture, and the nut threaded onto the tightening bolt is engaged with a side of the at least one end plate of the end plates opposite to the side that adjoins the prismatic battery modules.

9. The battery pack of claim 1, wherein the coolant passages are defined by the plurality of prismatic battery modules.

10. The battery pack of claim 7, wherein, the side face in which the restraining straps are arranged is one of the remaining four side faces of the plurality of prismatic battery modules.

11. A battery pack comprising:
a battery module assembly having a plurality of prismatic battery modules, each prismatic battery module of said plurality of prismatic battery modules having six side faces with opposing side faces having substantially equal side face surface area, two of the side faces having surface areas equal to or greater than the remaining four side faces surface areas;
said plurality of prismatic battery modules arranged so that said two side faces of each prismatic battery module of said plurality of prismatic battery modules are adjacent a respective one side face of said two side faces of adjacent prismatic battery modules of said plurality of prismatic battery modules except at a first end and a second end in a direction of arrangement of said plurality of prismatic battery modules will coolant passages defined between the plurality of prismatic battery modules; and
restraining straps tying the prismatic battery modules together arranged on a side face of the remaining four side faces, said restraining straps each have a height, a width and a length, wherein the length is perpendicular to the surface areas of said two of the side faces having surface areas equal to or greater than the remaining four side faces surface areas and said height is greater than said width.

12. The battery pack of claim 11, wherein the length of the restraining straps is greater than the height of the restraining steps.

13. The battery pack of claim 12, further comprising a mounting portion having a surface wherein the mounting portion is provided at a first end and a second end of the restraining straps.

14. The battery pack of claim 3, wherein the restraining straps have members of circular cross-section.

15. The battery pack of claim 11, wherein the coolant passages are formed between end plates and the first end and the second end of the plurality of prismatic battery modules.

16. The battery pack comprising:
a battery module assembly having a plurality of prismatic battery modules, each prismatic battery module of said plurality of prismatic battery modules having six side faces with opposing side faces having substantially equal side face surface area, two of the side faces having surface areas equal to or greater than the remaining four side faces surface areas;
said plurality of prismatic battery modules arranged so that said two side faces of each prismatic battery module of said plurality of prismatic battery modules are adjacent a respective one side face of said two side faces of adjacent prismatic battery modules of said plurality of prismatic battery modules except at a first end and a second end in a direction of arrangement of said plurality of prismatic battery modules;
an end plate arranged at the first end of the battery module assembly having a mounting portion;
a restraining strap component tying the prismatic battery modules together;
a screw mechanism arranged along a longitudinal direction of the restraining strap such that an effective length of the restraining strap can be extended or diminished, and said screw mechanism being provided at at least one end of the restraining strap and at the mounting portion of one end plate.

said screw mechanism bearing as an axial load pressure produced by expansion and/or rise in internal pressure resulting from the charging/discharging of said plurality of prismatic battery modules.

17. The battery pack according to claim 16, further comprising:

said restraining strap component including two restraining straps; and another end plate.

18. The battery pack of claim 1, further comprising each restrainig strap of said restraining straps having a mounting strip.

19. The battery pack of claim 1, further comprising each restraining strap of said restraining straps having a mounting portion.

20. The battery pack of claim 19, further comprising each restraining strap of said restraining straps having a mounting strip.

21. The battery pack of claim 7, further comprising each restraining strap of said restraining straps having a mounting strip.

22. The battery pack of claim 7, further comprising each restraining strap of said restraining straps having a mounting portion.

23. The battery pack of claim 22, further comprising each restraining strap of said restraining straps having a mounting strip.

24. The battery pack of claim 11, further comprising each restraining strap of said restraining straps having a mounting strip.

25. The battery pack of claim 11, further comprising each restraining strap of said restraining straps having a mounting portion.

26. The battery pack of claim 25, further comprising each restraining strap of said restraining straps having a mounting strip.

27. The battery pack of claim 16, further comprising said restraining strap component having a mounting strip.

28. The battery pack of claim 16, further comprising said restraining strap component having a mounting portion.

29. The battery pack of claim 28, further comprising said restraining strap component having a mounting strip.

\* \* \* \* \*